(12) United States Patent
Kimura et al.

(10) Patent No.: US 6,296,572 B1
(45) Date of Patent: Oct. 2, 2001

(54) POWER TRANSMISSION MECHANISM

(75) Inventors: Kazuya Kimura; Akifumi Uryu; Masahiko Okada; Tomonari Kato, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/355,538

(22) PCT Filed: Nov. 24, 1998

(86) PCT No.: PCT/JP98/05266

§ 371 Date: Sep. 24, 1999

§ 102(e) Date: Sep. 24, 1999

(87) PCT Pub. No.: WO99/28643

PCT Pub. Date: Jun. 10, 1999

(30) Foreign Application Priority Data

Dec. 1, 1997 (JP) .................................................. 9-330075

(51) Int. Cl.[7] ............................. F16F 19/00; F16F 27/00; F16F 37/02
(52) U.S. Cl. ......................... 464/29; 464/57; 192/84.961
(58) Field of Search .................................. 464/59, 60, 29, 464/30, 51, 87, 177, 57, 160, 77, 58; 192/89.94, 84.961

(56) References Cited

U.S. PATENT DOCUMENTS

| | | | |
|---|---|---|---|
| 1,541,748 | * | 6/1925 | Davis ....................................... 464/59 |
| 2,061,827 | * | 11/1936 | Brooks ..................................... 464/59 |
| 3,762,516 | * | 10/1973 | Matsushita ............................... 464/59 |
| 3,953,987 | | 5/1976 | Strasburg et al. ........................ 64/27 |
| 4,241,818 | * | 12/1980 | Miller ..................................... 192/55 |
| 4,296,851 | * | 10/1981 | Pierce .................................. 192/84 C |
| 4,445,606 | * | 5/1984 | Van Laningham ....................... 464/31 |
| 4,804,075 | * | 2/1989 | Koitabashi ............................... 464/76 |
| 5,219,273 | * | 6/1993 | Chang ..................................... 464/89 |
| 5,387,157 | | 2/1995 | Nameny ................................... 464/98 |
| 5,692,591 | * | 12/1997 | Kimura .................................... 464/83 |
| 5,899,811 | * | 5/1999 | Kishibuchi et al. .................... 464/89 |
| 5,944,158 | * | 8/1999 | Okazaki ............................ 192/84.96 |
| 6,015,349 | * | 1/2000 | Okada et al. ........................... 464/31 |
| 6,077,048 | * | 6/2000 | Okada et al. ......................... 417/223 |

* cited by examiner

Primary Examiner—Lynne E. Browne
Assistant Examiner—Kenn Thompson
(74) Attorney, Agent, or Firm—Morgan & Finnegan, LLP

(57) ABSTRACT

A power transmission mechanism for power-transmittably coupling a rotating unit of a compressor (11) composed of a drive shaft (17), a rotating support (23) and a swash plate (27) with an engine (62), comprising a pulley (56) and an armature (58), both of which constitute a first rotating body provided on a side of the engine, a hub (57), which serve as a second rotating body coupled to the drive shaft of the compressor, and a spring (64), which serves as an elastic means for coupling the first and second rotating bodies. A spring constant of the spring (64) is set such that a resonant frequency (fR) determined by the spring constant and a sum of a moment of inertia of the rotating unit of the compressor and a moment of inertia of the second rotating body as dominant factors is made smaller than a minimum frequency (f1) of torque variation produced on the compressor and more preferably smaller than a minimum frequency (f2) of torque variation produced on the engine.

42 Claims, 7 Drawing Sheets

POWER TRANSMISSION MECHANISM

TECHNICAL FIELD

The present invention relates to a power transmission mechanism for connecting a drive source to a driven apparatus, which includes a rotating member. More particularly, the present invention pertains to a power transmission mechanism used in a compressor of a vehicle air conditioner.

BACKGROUND ART

A compressor used in a vehicle air conditioner includes a drive shaft and an inner compression mechanism. The compression mechanism is actuated by rotation of the drive shaft. The compressor also includes an electromagnetic clutch to transmit power from the vehicle's engine to the drive shaft. The clutch is engaged and disengaged based, for example, on the cooling load in an external refrigerant circuit. A typical electromagnetic clutch includes a pulley, an armature and a coupling member. The coupling member connects the armature to an inner hub, which is located at the distal end of the drive shaft. The armature is selectively engaged with and disengaged from the pulley. When the clutch is electromagnetically engaged, engine power is transmitted to the drive shaft by a belt, the pulley, the armature, the coupling member and the inner hub. The coupling member, which is supported by the inner hub, separates the armature from the pulley when the electromagnetic force of the clutch is stopped. Rubber dampener (rubber hub) type and a leaf spring type coupling members are known in the art. The leaf springs used in leaf spring type coupling members are practically ineffective as dampeners.

If a coupling member for coupling an armature with an inner hub is made of rubber, torque fluctuation in the compressor is absorbed by the rubber, which serves as a dampener. However, the coupling member must function not only as a dampener but also as a torque transmitting member. Thus, the spring constant of the rubber must be relatively high to make the coupling member durable. The resonance frequency is determined by the moment of inertia of rotation system of the compressor and the spring constant of the rubber. When the spring constant of the rubber is high, the resonance frequency tends to be higher than the lowest frequency of torque fluctuation generated in the rotation system of the compressor. A typical compressor operates at 1000 rpm to 2000 rpm. If the frequency of torque fluctuation of the compressor substantially matches the resonance frequency when the compressor is operating in a normal speed range, resonance occurs and increases the torque fluctuation. The increased torque fluctuation produces noise in the vehicle.

Using leaf springs, in comparison to rubber, to couple the armature and the inner hub increases the resonance frequency. Further, the leaf springs are ineffective as dampeners. Thus, when resonance occurs, torque fluctuation is excessive, which results in seizing and wearing of contact surfaces of the electromagnetic clutch.

An objective of the present invention is to provide a power transmission mechanism that suppresses vibration and noise due to torque fluctuation and prevents the inner parts of the compressor from being damaged.

DISCLOSURE OF THE INVENTION

The present invention relates to a power transmission mechanism that couples a drive source with a rotating member of a driven apparatus. The power transmission mechanism includes a first rotor, a second rotor and elastic means. The first rotor is provided in the drive source. The second rotor is provided in the driven apparatus and is coupled to the rotating member. The elastic means couples the first rotor with the second rotor.

(1) The resonance frequency (fR) is determined based chiefly on the spring constant of the elastic means and the sum of the moment of inertia of the rotating member in the driven apparatus and the moment of inertia of the second rotor. According to a power transmission mechanism of a first invention, the spring constant of the elastic means is determined such that the resonance frequency (fR) is lower than the lowest frequency (f1) of torque fluctuation of the driven apparatus (fR<f1).

The first rotor, the elastic member and the second rotor not only form a power transmission system from the drive source to the driven apparatus, but also a vibrating system, which includes the driven apparatus. When power from the first rotor, which is coupled to the drive source, is transmitted to the second rotor, which is coupled to the driven apparatus, the rotating member of the driven apparatus receives a load. The load generates repulsion load torque. Depending on the type of the driven apparatus, the load and the repulsion load torque fluctuate periodically. However, according to the first invention, the spring constant of the elastic means is carefully selected such that the resonance frequency (fR), which is determined based chiefly on the spring constant of the elastic means and the sum of the moment of inertia of the rotating member of the driven apparatus and the moment of inertia of the second rotor, is lower than the lowest frequency (f1) of torque fluctuation generated in the driven apparatus. In other words, the resonance frequency (fR) is outside of the frequency range of torque fluctuation generated in the driven apparatus. Therefore, for any torque fluctuation in the driven apparatus, the amplitude of the torque fluctuation is not increased by resonance (resonance phenomena) due to the mechanical characteristics of the power transmission system. As a result, excessive noise and damage in the rotation system due to torque fluctuations of the driven apparatus are prevented.

(2) The resonance frequency (fR) is determined based chiefly on the spring constant of the elastic means and the sum of the moment of inertia of the rotating member of the driven apparatus and the moment of inertia of the second rotor. According to a power transmission mechanism of a second invention, the spring constant of the elastic means is determined such that the resonance frequency (fR) is lower than the lowest frequency (f2) of torque fluctuation generated in the drive source (fR<f2).

The first rotor, the elastic member and the second rotor form not only a power transmission system from the drive source to the driven apparatus, but also a vibrating system, which includes the drive source. The elastic means transmits rotation power of the first rotor, which is coupled to the drive source, to the second rotor, which is coupled to driven apparatus. Accordingly, the torque of the drive source is transmitted to the driven apparatus against the load acting on the rotating member of the driven apparatus. Depending on the type of the drive source, the torque fluctuates periodically. However, according to the second invention, the spring constant of the elastic means is carefully selected such that the resonance frequency (fR), which is determined based chiefly on the spring constant of the elastic means and the sum of the moment of inertia of the rotating member of the driven apparatus and the moment of inertia of the second rotor, is lower than the lowest frequency (f2) of the torque fluctuation generated in the drive source. In other words, the resonance frequency (fR) is outside of the frequency range of torque fluctuation generated in the drive source. Therefore, given any torque fluctuation in the drive source, the amplitude of the torque fluctuation is not increased by resonance (resonance phenomena) due to the mechanical characteristics of the power transmission system. As a result, excessive noise and damage in the rotation system due to torque fluctuations of the driven apparatus are prevented.

The first invention and the second invention may be combined. That is, it is preferable that the spring constant of the elastic means be determined such that the resonance frequency (fR), which is determined based chiefly on the spring constant of the elastic means and the sum of the moment of inertia of the rotating member of the driven apparatus and the moment of inertia of the second rotor, is lower than the lowest frequency (f1) of the torque fluctuation generated in the driven apparatus and lower than the lowest frequency (f2) of the torque fluctuation generated in the drive source.

(3) In the power transmission mechanism according to the first and second inventions, the first rotor preferably comprises a pulley that is driven by the drive source through a belt, and the second rotor preferably comprises a hub coupled to the drive shaft, which comprises the rotating member of the driven apparatus. This construction creates a space for the elastic means between the pulley serving as the first rotor and the hub serving as the second rotor coupled to the drive shaft of the driven apparatus.

(4) In the power transmission mechanism according to the first and second inventions, the first rotor preferably comprises a pulley driven by the drive source through a belt and an armature of an electromagnetic clutch, which can be engaged with the pulley to integrally rotate with the pulley. Also, the second rotor preferably comprises a hub coupled to the drive shaft, which comprises the rotating member of the driven apparatus. This construction creates a space for the elastic means between the armature of the electromagnetic clutch, which forms the first rotor, and the hub, which serves as the second rotor coupled to the drive shaft. Further, this construction may be used in a compressor having a conventional electromagnetic clutch without changing the structure of the clutch.

(5) The elastic means preferably functions as an urging means to urge the armature in a direction disengaging the armature from the pulley. This construction eliminates the need for an integral member for urging the armature and for suppressing vibration, which reduces the number of parts and simplifies the structure.

(6) The elastic means preferably comprises a spiral spring. The spiral spring requires a relatively flat space as described later. Therefore, the space for the spiral spring is easily formed.

(7) In one preference, the elastic means comprises a spiral spring that is axially expanded before being installed. In this case, the spiral spring requires relatively flat space as described later. Therefore, the space for the spiral spring is easily formed. Since the spiral spring urges the armature in a direction to separate the armature from the pulley, the spiral spring quickly disengages the armature from the pulley when electromagnetic force of the electromagnetic clutch disappears.

(8) In another preference, the elastic means comprises a helical spring. The property of the coil spring is simpler than that of the spiral spring with regard to stress caused by torsion and the state of centrifugal force when rotated. Therefore, using a coil spring simplifies designing of the spring used as the elastic means.

(9) The cross-section of a spring serving as the elastic means is preferably rectangular. For a given spring constant, the cross-sectional area of a spring having rectangular cross-section is smaller than that of a spring having a circular cross-section. Therefore, a spring having rectangular cross-section reduces the size and the weight of the spring.

BEST MODE FOR CARRYING OUT THE INVENTION

Power transmission mechanisms according to first and second embodiments of the present invention will now be described with reference to the drawings. The power transmission mechanisms are used in compressors.

First Embodiment

Figure 1:
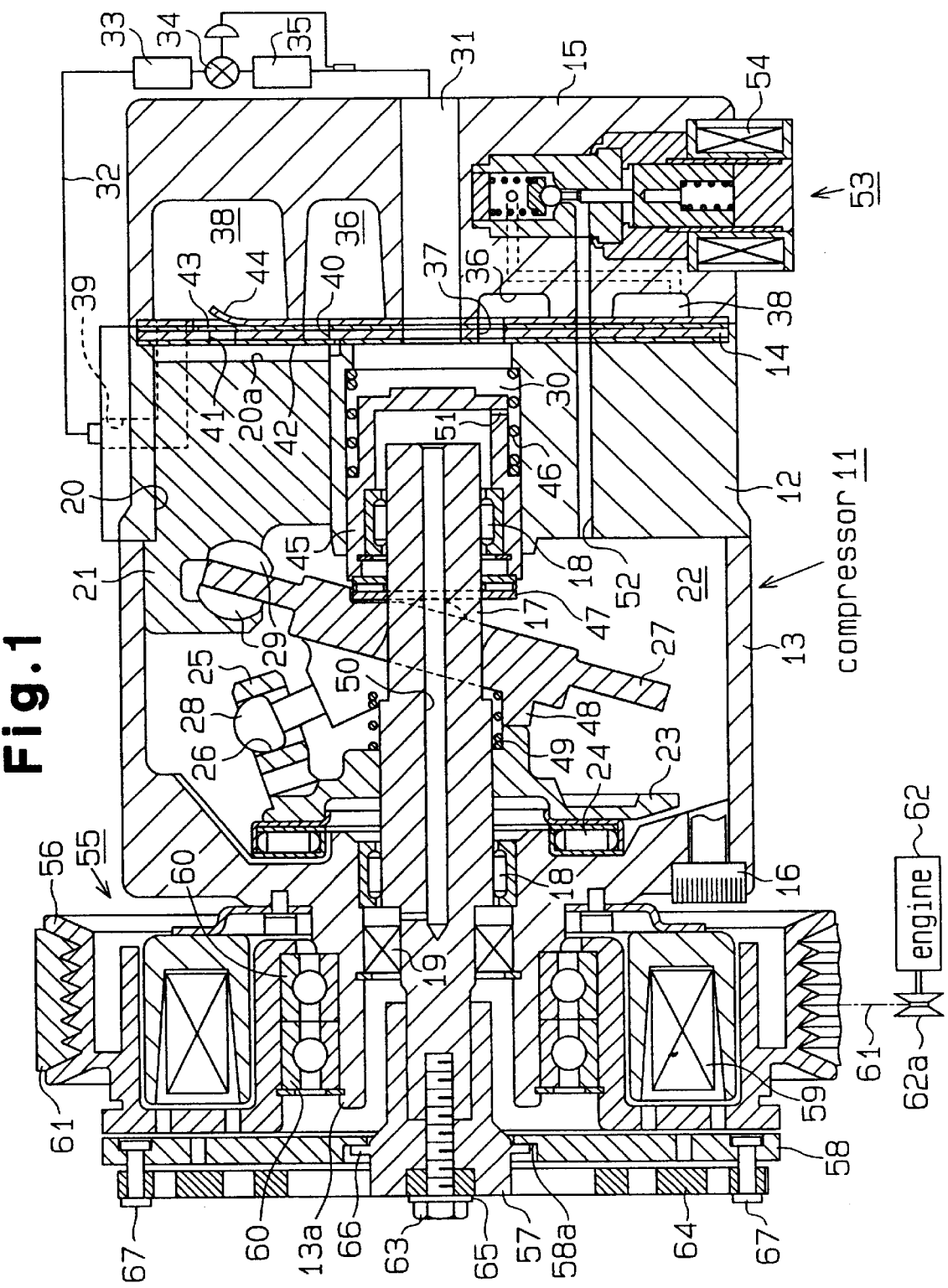
FIG. 1 is a cross-sectional view illustrating a swash plate type compressor having a power transmission mechanism according to a first embodiment.

FIGS. 1 to 5B show the first embodiment of the present invention. As shown in FIG. 1, a driven apparatus, or variable displacement compressor 11, has a cylinder block 12, a front housing 13 secured to the front face of the cylinder block 12, a valve plate 14 and a rear housing 15. The rear housing 15 is attached to the rear face of the cylinder block 12 with the valve plate 14 in between. The parts 12, 13, 14 and 15 are fastened together by bolts 16 (only one is shown in the drawings) thereby forming the housing of the compressor 11.

A drive shaft 17 extends in the cylinder block 12 and the front housing 13 and is rotatably supported by front and rear radial bearings 18. A lip seal 19 is located between the circumferential surface of the front portion of the drive shaft 17 and the inner surface of a support cylinder 13a protruding forward from the front housing 13. The cylinder block 12 has cylinder bores 20. The cylinder bores 20 are spaced apart by equal angular intervals about the drive shaft 17 and extend parallel to the drive shaft 17. Each bore 20 accommodates a single-headed piston 21. In each cylinder bore 20, the end face of the piston 21 and the valve plate 14 define a compression chamber 20a, the volume of which is variable. The compressor 11 of the present embodiment is a seven-cylinder type.

The cylinder block 12 and the front housing 13 define a crank chamber 22. A rotating support (lug plate) 23 is attached to the drive shaft 17 in the crank chamber 22 to rotate integrally with the drive shaft 17. A thrust bearing 24 is located between the front face of the rotating support 23 and the inner wall of the front housing 13. A pair of support arms 25 extend from the back of the rotating support 23 toward the cylinder block 12. A guide hole 26 is formed in the distal end of each arm.

A swash plate 27 is located in the crank chamber 22. The swash plate 27 is substantially disk-shaped and has a center hole to receive the drive shaft 17. The swash plate 27 is supported on the drive shaft 17 by cooperation between the center hole and the drive shaft 17 and can tilt, or incline. A pair of spherical couplers 28 protrude from the front face of the swash plate 27. Each spherical coupler 28 is rotatably and slidably fitted in the corresponding guide hole 26, which forms a hinge mechanism. The hinge mechanism connects the swash plate 27 to the rotating support 23 such that the swash plate 27 can incline relative to the rotating support 23. Each piston 21 is coupled to the periphery of the swash plate 27 by a pair of shoes 29. Rotation of the drive shaft 17 rotates the swash plate 27 together with the rotating support 23, which reciprocates each piston 21 in the associated cylinder bore 20.

A central chamber 30 extends through the center portion of the cylinder block 12 to accommodate the rear end of the drive shaft 17. A suction passage 31 is defined at the center of the valve plate 14 and the rear housing 15. The passage 31 extends along the axis of the drive shaft 17. The front end of the suction passage 31 communicates with the central chamber 30. The rear end of the suction passage 31 is connected to an external refrigerant circuit 32. The refrigerant circuit 32 includes at least a condenser 33, an expansion valve 34 and an evaporator 35.

An annular suction chamber 36 is defined in the center portion of the rear housing 15. The suction chamber 36 is connected to the central chamber 30 by a communication port 37. An annular discharge chamber 38 is defined about the annular suction chamber 36 in the rear housing 15. The discharge chamber 38 is connected to the external refrigerant circuit 32 by a discharge passage 39 formed in the housing. The valve plate 14 has suction ports 40 and discharge ports 41. One of the suction ports 40 and one of the discharge ports 41 corresponds to each of the cylinder bores 20. Each suction port 40 connects the corresponding compression chamber 20a with the suction chamber 36. Each discharge port 41 connects the corresponding compression chamber 20a with the discharge chamber 38. Suction valves flaps 42 are formed on the valve plate 14 at the side facing the cylinder block 12. The suction valve flaps 42 open and close the corresponding suction ports 40. Discharge valve flaps 43 are formed on the valve plate at the side facing the discharge chamber 38. The discharge valve flaps 43 open and close corresponding the discharge ports 41. Each discharge valve flap 43 has a retainer 44 to limit its maximum opening amount.

A cup-shaped shutter 45 is accommodated in the central chamber 30 of the cylinder block 12. The shutter 45 slides along the axis of the drive shaft 17. A suction passage opening spring 46 is located between the shutter 45 and the rear end of the central chamber 30 to urge the shutter 45 toward the swash plate 27. The rear radial bearing 18 is fitted in the shutter 45 to move integrally with the shutter 45. Thus, as the shutter 45 moves, the rear radial bearing 18 slides on the drive shaft 17. An annular thrust bearing 47 is located between the swash plate 27 and the shutter 45 to slide on the drive shaft 17. When the swash plate 27 is at the minimum inclination position, the rear end of the shutter 45 is moved to a closed position against the force of the suction passage opening spring 46. Specifically, the shutter 45 closes the front opening of the suction passage 31. The minimum inclination of the swash plate 27 is slightly more than zero degrees. The inclination of the swash plate refers to an angle formed by the swash plate 17 and a plane perpendicular to the drive shaft 17.

As shown in FIG. 1, a stopper projection 48 is formed on the lower front face of the swash plate 27. Contact between the stopper projection 48 and the rotating support 23 defines the maximum inclination position of the swash plate 27. An inclination decreasing spring 49 is located between the rotating support 23 and the swash plate 27. The inclination decreasing spring 49 urges the swash plate 27 toward the minimum inclination position.

The drive shaft 17 has a pressure release passage 50, which extends along the axis of the drive shaft 17. The pressure release passage 50 connects the crank chamber 22 with the interior of the shutter 45. A throttle, or pressure release hole 51, is formed in the rear end portion of the shutter 45. The pressure release hole 51 connects the interior of the shutter 45 with the interior of the central chamber 30. The pressure of the crank chamber 22 is released to the suction chamber 36 via the pressure release passage 50, the interior of the shutter 45, the pressure release hole 51, the central chamber 30 and the communication port 37.

A supply passage 52 is formed in the cylinder block 12, the valve plate 14 and the rear housing 15, which form the compressor housing. The supply passage 52 connects the discharge chamber 38 with the crank chamber 22. A displacement control valve 53 is embedded in the rear housing 15 and is located in the supply passage 52. The control valve 53 has a solenoid 54, which is controlled by an external controller (not shown). The controller controls current supplied to the solenoid 54. That is, the controller excites and de-excites the solenoid 54, which closes and opens the control valve 53. As the control valve 53 is opened and closed, pressure supply from the discharge chamber 38 to the crank chamber 22 is controlled, which adjusts the inner pressure of the crank chamber 22. Accordingly, the inclination of the swash plate 27 is determined.

Next, a power transmission mechanism will be described. The power transmission mechanism transmits power from a drive source, or vehicle engine 62, to the drive shaft 17 of the compressor 11.

An electromagnetic clutch 55 is located in front of the front housing 13. The electromagnetic clutch 55 includes a pulley 56, a hub 57, an armature 58 and a solenoid 59. The solenoid 59 is connected to an external controller (not shown). The external controller controls current supplied to the solenoid 59 thereby exciting and de-exciting the solenoid 59. In the first embodiment, the pulley 56 and the armature 58 form a first rotor and the hub 57 forms a second rotor. The drive shaft 17 of the compressor 11, the rotating support 23 and the swash plate 27 form a rotating member of a driven apparatus.

The pulley 56 is rotatably supported on the support cylinder 13a of the front housing 13 by an angular bearing 60. A belt 61 is engaged with the pulley 56 and a pulley 62a of the vehicle engine 62. The belt 61 connects the pulley 56 with the vehicle engine 62. The ratio of the diameter of the pulley 62a to the diameter of the pulley 56, or the pulley ratio, is preferably in a range between 1.0 to 1.3. In the first embodiment, the pulley ratio is 1.0, and the engine 62 is a six-cylinder, four-stroke engine.

The hub 57, which is metal, is formed substantially like a cylinder and is secured to or engaged with the front end of the drive shaft 17 by a bolt 63 to rotate integrally with the drive shaft 17. The disk-shaped armature 58 is located about the hub 57. The armature 58 is selectively engaged with and disengaged from the front face of the pulley 56. The armature 58 is coupled to the hub 57 by a spiral spring 64. In other words, an elastic means, or the spiral spring 64, elastically connects the first rotor, which is connected to the drive source, with the second rotor, which is connected to the driven apparatus.

Figure 2:
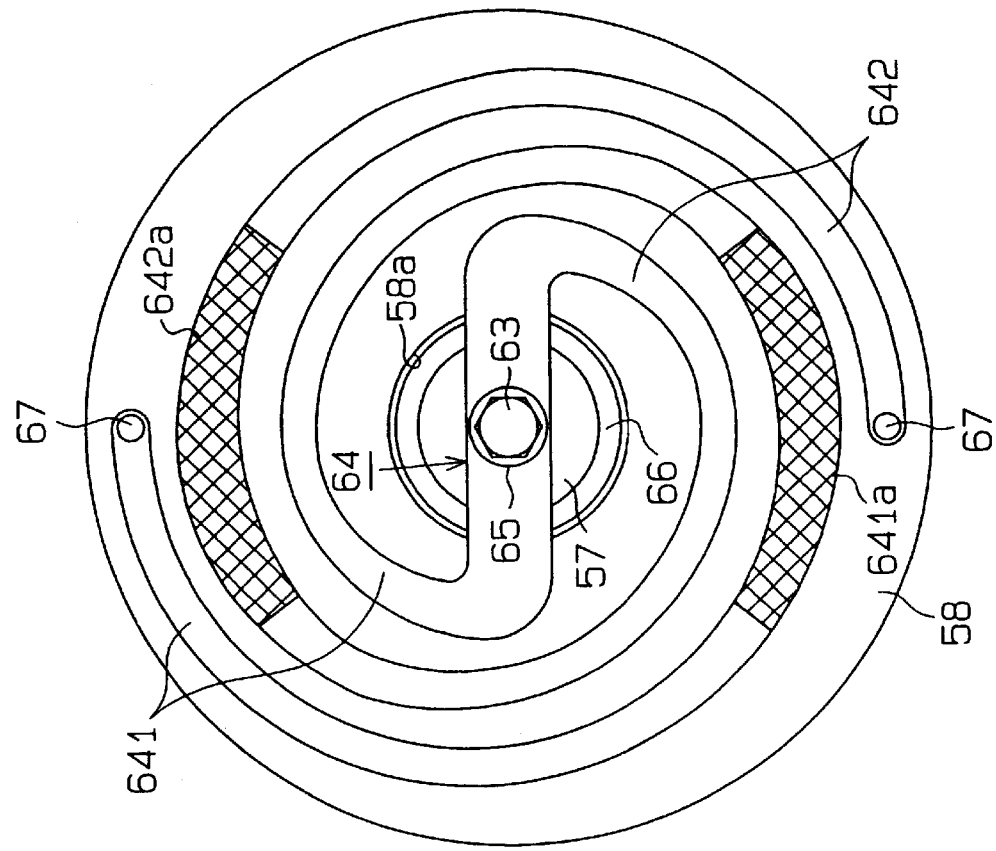
FIG. 2 is a plan view showing the assembled spiral spring of the first embodiment.

More specifically, as shown in FIGS. 1 and 2, the center of the spiral spring 64 is secured to the front face of the hub 57 by a bolt 63 and a washer 65. A hole for loosely receiving the hub 57 and a recessed step 58a are formed in the center of the disk-shaped armature 58. A collar-like stopper 66 is formed in the circumference of the hub 57. The location of he stopper 66 corresponds to the location of the step 58a. Contact between the stopper 66 and the step 58a prevents the armature 58 from separating from the front face of the pulley 56 beyond a predetermined distance. The solenoid 59 is located in front of the front housing 13 to face the armature 58. Part of the pulley 56 is between the solenoid 59 and the armature 58.

Description of the Spiral Spring 64

As shown in FIG. 2, the spiral spring 64 includes two arms 641, 642. The arms 641, 642 spirally extend from the center, or the part receiving the bolt 63, in a clockwise direction. The arms 641, 642 are symmetric with respect to the bolt 63. Further, each arm 641, 642 surrounds the bolt 63 by one and quarter (1+¼) turns. In other words, each arm 641, 642 angularly extends by 450 degrees.

Figure 3:
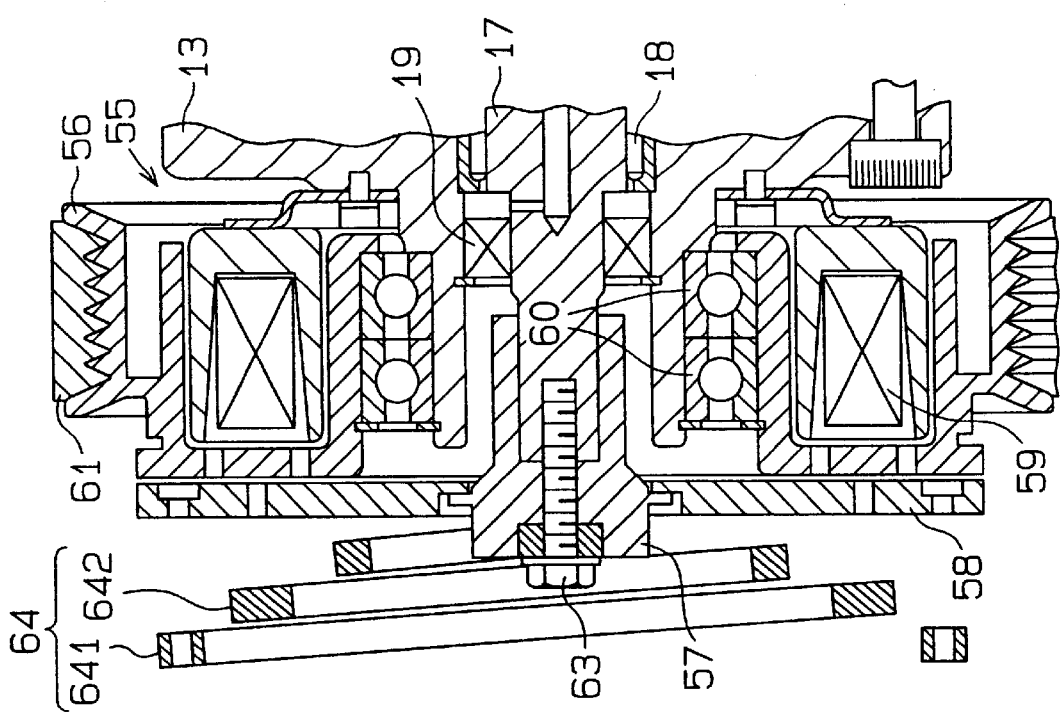
FIG. 3 is a partial cross-sectional view where the ends of the spiral spring are free.

As shown in FIGS. 1 and 2, the outer end of each arm 641, 642 is pivotally connected to the periphery of the armature 58 by a rotational shaft member, or pin 67. The positions of the pins 67 are symmetric with respect to the bolt 63. Before attaching the outer ends of the arms 641, 642 to the armature 58, that is, when the ends of the arms 641, 642 are free, the spring 64 is an axially extended spiral as shown in FIG. 3. Outer portion of the spring 64 is located axially farther from the armature 58. In other words, the spiral spring 64 is shaped like a axially extended (in the axial direction of the bolt 63) volute spring with the center being its vertex. Attaching the outer ends of the arms 641, 642 to the armature 58 axially compresses the spiral spring 64. The spiral spring 64 serves as urging means for separating the armature 58 from the pulley 56.

Each arm 641, 642 of the spiral spring 64 has a relatively thick portion 641a, 642a, illustrated by crosshatching in FIG. 2. Each thick portion 641a, 642a is angularly spaced apart from the corresponding pin 67 by 180 degrees and on the opposite side of the bolt 63 from the corresponding pin 67. The part that is spaced apart from the pin 67 by 180 degrees is the farthest from the corresponding pin 67, which transmits power from the armature 58 to the arm of the spiral spring 64. Therefore, to improve the strength of each arm, the cross-sectional area of each thick portion 641a, 642a is larger than that of the remainder of the arms 641, 642. In the first embodiment, the arms 641, 642 of the spiral spring 64 have a substantially rectangular shaped cross section, and the axial dimension is substantially constant from the radially inner end to the radially outer end. The radial dimension of each thick portion 641a, 642a is greater than that of the other parts of the arms, which increases the cross-sectional area of the thick portions 641a, 642a compared to remainder of the arms 641, 642.

The spiral spring 64 shown in FIGS. 1 to 3 is manufactured, for example, by punching and pressing a metal plate (for example, a steel plate). The resonance frequency fR of the transmission mechanism is determined based chiefly on the spring constant of the spring 64 and the sum of the moment of inertia of the rotating member of the compressor 11 and the moment of inertia of the hub 57. The spring constant of the spiral spring 64 is determined such that the resonance frequency fR is lower than the lowest frequency f1 of torque fluctuation generated in the compressor 11. More preferably, the spring constant of the spiral spring 64 is also determined such that the resonance frequency fR is lower than the lowest frequency f2 of torque fluctuation generated in the engine 62. It has been confirmed that the moment of inertia of the pulley 56 and the spring constant of the belt 61 have little influence on the resonance frequency fR. The spring constant of the spiral spring 64 is influenced by the unique shape of the spiral spring 64.

The mechanical characteristics of the spiral spring 64 and technical terms used in the specification will be described later.

The basic operation of the variable displacement compressor 11 having the above described power transmission mechanism will now be described.

When the engine 62 is running, the power of the engine 62 is transmitted to the pulley 56 of the electromagnetic clutch 55 via the belt 61, which constantly rotates the pulley 56. If a cooling load is acting on the external refrigerant circuit 32, the external controller excites the solenoid 59 thereby generating electromagnetic force. The generated electromagnetic force causes the armature 58 to contact the front face of the pulley 56 against the force of the spiral spring 64. Then, rotation of the pulley 56 and armature 58, which are frictionally joined together, is transmitted to the hub 57 and the drive shaft 17 via the spiral spring 64. If a cooling load is not acting on the external refrigerant circuit 32, the external controller de-excites the solenoid 59 thereby discontinuing the electromagnetic force, which causes the armature 58 to separate from the front face of the pulley 58 by the force of the spiral spring 64. Accordingly, the drive shaft 17 is disconnected from the engine 62.

In FIG. 1, the swash plate 27 is maximally inclined. In this state, the solenoid 54 is excited to close the displacement control valve 53, which closes the supply passage 52. Therefore, compressed refrigerant gas, the pressure of which is equal to the discharge pressure Pd, is not supplied to the crank chamber 22 from the discharge chamber 38 through the supply passage 52. The refrigerant gas in the crank chamber 22 is released to the suction chamber 36 through the pressure release passage 50, the interior of the shutter 45, the pressure release hole 51, the central chamber 30 and the communication port 37. Thus, the pressure Pc of the crank chamber 22 gradually approaches the relatively low pressure of the suction chamber 36 (the suction pressure Ps), which maintains the swash plate 27 at the maximum inclination. Accordingly, the compressor 11 operates with the maximum displacement.

The operation of the compressor 11 at the maximum displacement decreases the cooling load, which gradually lowers the temperature at the outlet of the evaporator 35 in the external refrigerant circuit 32. When the temperature of the evaporator 35 is equal to or lower than a predetermined reference temperature (for example, a frost forming temperature), the solenoid 54 is de-excited and the displacement control valve 53 is opened. This supplies pressurized refrigerant gas, the pressure of which is equal to the discharge pressure Pd, from the discharge chamber 38 to the crank chamber 22 through the supply passage 52. As a result, the crank chamber pressure Pc is raised, which quickly moves the swash plate 27 from the maximum inclination to the minimum inclination.

When moving to the minimum inclination position, the swash plate 27 pushes the shutter 45 rearward through the thrust bearing 47 against the force of the suction passage opening spring 46. Specifically, the swash plate 27 moves the shutter 45 from the open position (the position shown in FIG. 1) to the closed position. When the swash plate 27 is at the minimum inclination position, the shutter 45 is at the closed position. The rear face of the shutter 45 closes the front opening of the suction passage 31. In this manner, the suction passage 31 is closed, which prevents refrigerant gas from entering the suction chamber 36 from the external refrigerant circuit 32.

When at the minimum inclination position, the inclination angle of the swash plate 27 is not zero degrees. Thus, compressed refrigerant gas continues to be discharged from the cylinder bores 20 to the discharge chamber 38, and the compressor 11 operates at the minimum displacement. Some compressed refrigerant gas in the discharge chamber 38 flows to the crank chamber 22 through the supply passage 52. Refrigerant gas in the crank chamber 22 flows to the suction chamber 36 through the pressure release passage 50, the interior of the shutter 45, the pressure release hole 51, the central chamber 30 and the communication port 37. The refrigerant gas is then drawn into the cylinder bores 20. In this manner, when the compressor 11 is operating at the minimum displacement, refrigerant gas circulates within the compressor.

Continued operation of the compressor 11 at the minimum displacement results in an increase in the cooling load and an increase of the temperature at the outlet of the evaporator 35. Then, the solenoid 54 is excited to close the displacement control valve 53. As a result, the supply of compressed refrigerant gas from the discharge chamber 38 to the crank chamber 22 is stopped and refrigerant gas only flows from the crank chamber 22 to the suction chamber 36. Accordingly, the crank chamber pressure Pc is gradually lowered, and the swash plate 27 is moved from the minimum inclination position to the maximum inclination position. As the swash plate 27 moves to the maximum inclination position, the shutter 45 is moved from the closed position toward the open position by the force of the suction passage opening spring 46. As shown in FIG. 1, the shutter 45 opens the suction passage 31, which allows refrigerant gas to flow from the external refrigerant circuit 32 to the suction chamber 36. The swash plate 27 is moved to the maximum inclination position and the compressor 11 operates at the maximum displacement.

When the engine 62 is stopped, the compressor 11 is stopped with the displacement control valve 53 open, which minimizes the inclination of the swash plate 27.

Mechanical Characteristics of Power Transmission Mechanism

The mechanical characteristics of the power transmission mechanism will now be described. The mechanical characteristics of the power transmission mechanism are greatly affected by the shape and the spring constant of the elastic member (elastic means), which couples the armature 58 forming the first rotor to the hub 57 serving as the second rotor. That is, the spring constant of the spiral spring 64 serving as the elastic member is determined considering the frequency of torque fluctuation in the compressor 11 serving as the driven apparatus and/or the frequency of torque fluctuation in the engine 62 serving as the drive source. The procedure for determining the spring constant of the spiral spring 64 will hereafter be described while showing important concepts to understand the present invention.

The frequency of torque fluctuation of a compressor refers to the product of the rotational speed of the drive shaft (the number of rotations per second) and the pulsation order of the compressor. The pulsation order of a compressor refers to the number of times compressed refrigerant gas is discharged from the compression chambers 20a to the discharge chamber 38 per one rotation of the drive shaft. For example, the compressor 11 of FIG. 1 is a seven-cylinder type. The pulsation order of the compressor 11 is therefore seven. Since the pulsation order of a compressor determined by the type of the compressor, the lowest frequency f1 of torque fluctuation of the compressor 11 is the product of the lowest rotation speed of the drive shaft 17 and the pulsation order of the compressor 11. The lowest rotation speed of the drive shaft 17 is determined by the lowest speed, or idling speed, of the engine 62 and the pulley ratio. For example, if the idling speed of the engine 62 is 600 rpm and the pulley ratio is 1.0, the lowest rotation speed of the drive shaft 17 is calculated by an equation (600 rpm/60 seconds)×1.0 and is 10 (rotation per second). Therefore, the lowest frequency f1 of torque fluctuation of the compressor 11 according to the first embodiment is represented by an equation:

$$f1 = 10 \times 7 = 70 \text{ Hz(hertz)}$$

The frequency of torque fluctuation of an engine refers to the product of the rotation speed (the number of rotation per second) of the engine crankshaft and the pulsation order of the engine. The pulsation order of an engine is the number of ignitions per revolution of the crankshaft. For example, the engine 62 shown in FIG. 1 is a six-cylinder, four-stroke engine, and the pulsation order of the engine 62 is 3 (3=6/2). Since the pulsation order of an engine is determined by the type of the engine, the lowest frequency f2 of torque fluctuation of the engine 62 is the product of the lowest rotation speed, or the idling speed, of the crankshaft and the pulsation order of the engine. Therefore, when the idling speed of the engine 62 is 600 rpm, the lowest frequency f2 of torque fluctuation of the engine 62 according to the first embodiment is represented by an equation:

$$f2 = (600 \text{ rpm}/60 \text{ seconds}) \times 3 = 30 \text{ Hz(hertz)}$$

Figure 4:
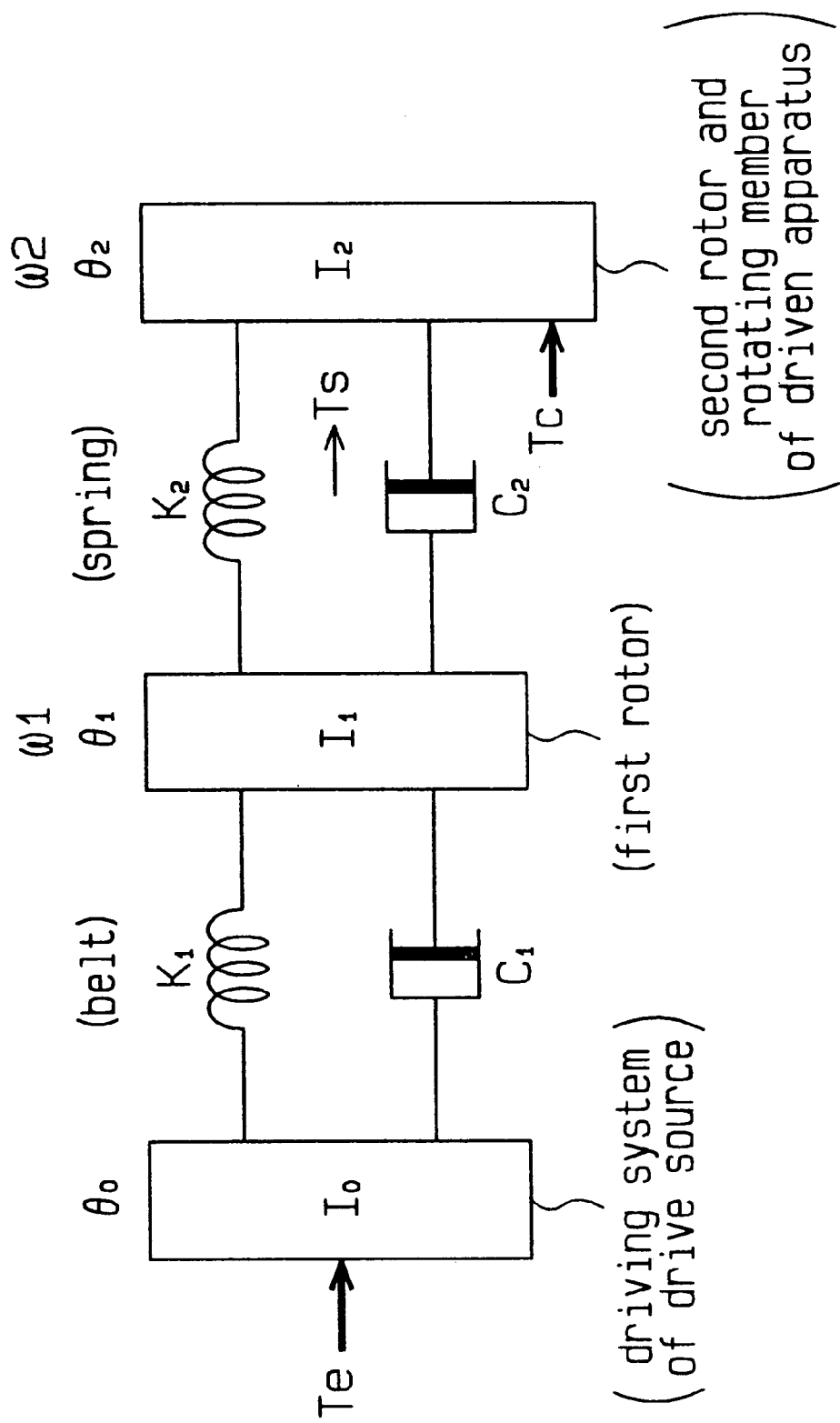
FIG. 4 is a schematic diagram showing a mechanical model of the torque transmission system corresponding to the power transmission mechanism of the present invention.

The resonance frequency fR of the power transmission system will now be described. FIG. 4 shows a mechanical model of a torque transmission system according to the power transmission mechanism of the present invention. The parameters in FIG. 4 are as follows:

$I_0$: moment of inertia of the engine drive system $I_1$: moment of inertia of the first rotor $I_2$: moment of inertia of the second rotor and the rotating member of the compressor $\theta_0$: rotational angle of the engine drive system $\theta_1$: rotational angle of the first rotor $\theta_2$: rotational angle of the second rotor and the rotating member of the compressor $K_1$: spring constant of the belt 61

$K_2$: spring constant of the spiral spring 64 (or other elastic member)

$C_1$: a coefficient of power loss at the belt 61

$C_2$: a coefficient of power loss at the spiral spring 64 (or other elastic member)

Te: input torque

Tc: restitution output torque

Referring to the mechanical model of FIG. 4, the following equations (1), (2) and (3) are satisfied regarding to the engine (drive source), the first rotor and the inner mechanism of the compressor (including the second rotor).

In the following equations, θ" represents a second-order differential ($d^2\theta/dt^2$) of an angle θ by a time t, and θ' is a first-order differential ($d\theta/dt$) of the angle θ by the time t.

$$I_0\theta_0" = Te - [C_1(\theta_0' - \theta_1') + K_1(\theta_0 \theta_1)] \quad (1)$$

$$I_1\theta_1" = [C_1(\theta_0' - \theta_1') + K_1(\theta_0 - \theta_1)] - [C_2(\theta_1' - \theta_2') + K_2(\theta_1 - \theta_2)] \quad (2)$$

$$I_2\theta_2 = C_2(\theta_1' - \theta_2') + K_2(\theta_1 - \theta_2) + Tc \quad (3)$$

The torque (shaft torque) Ts applied to the spiral spring 64 by the compressor is represented by an equation (4). The angular velocity ω1 of the first rotor, or the angular velocity of the pulley, and the angular velocity ω2 of the second rotor, or the angular velocity of the shaft, are represented by equations (5) and (6).

$$Ts = C_2(\theta_1' - \theta_2') + K_2(\theta_1 - \theta_2) \quad (4)$$

$$\omega 1 = \theta_1' = d\theta_1/dt \quad (5)$$

$$\omega 2 = \theta_2' = d\theta_2/dt \quad (6)$$

The shaft angular velocity ω2 of the equation (6) can be converted into the rotation speed of the compressor, or the number of rotations per minute. Therefore, relationship between the rotation speed of the compressor (the number of rotations per minute of the drive shaft 17) and the shaft torque Ts or the pulley angular velocity ω1 can be calculated based on the equations (1) to (6). It is difficult to deductively obtain the solutions of the above simultaneous differential equations. However, the relationship between the compressor rotation speed and Ts or ω1 can be obtained by performing a simulation based on approximate calculations with a computer.

Figure 5A:
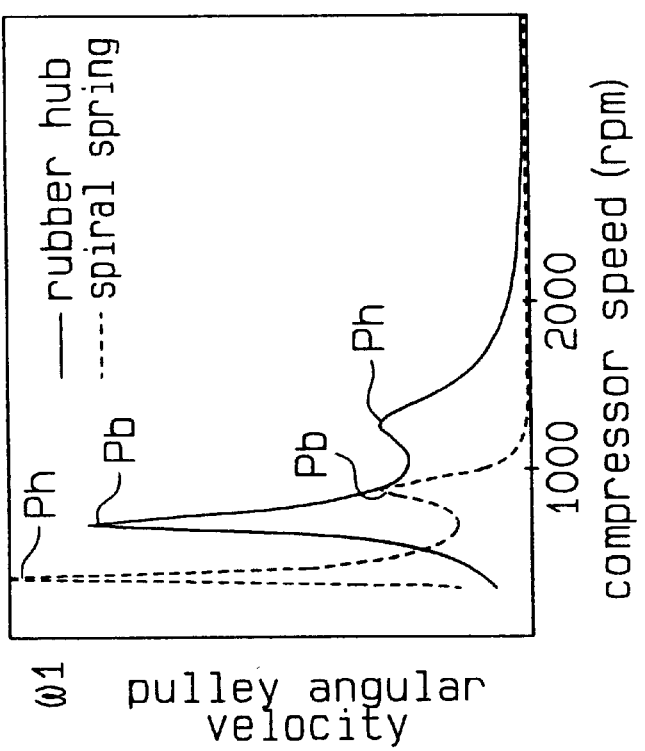
FIG. 5A is a graph showing the relationship between the rotational speed of a compressor and a shaft torque.
Figure 5B:
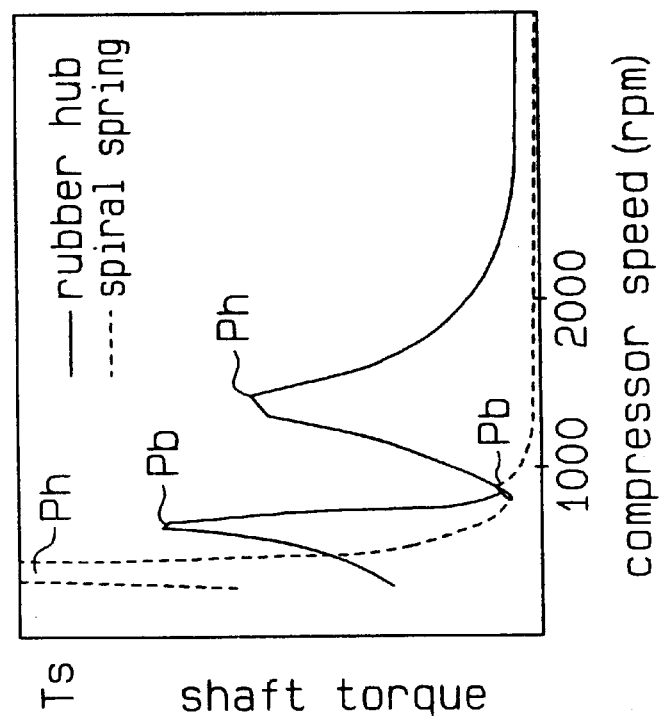
FIG. 5B is a graph showing the relationship between the rotational speed of a compressor and the angular velocity of a pulley.

FIGS. 5A and 5B show an example of computer simulation. FIG. 5A shows fluctuation of the torque Ts of the drive shaft 17 in relation to changes in the compressor rotation speed. FIG. 5B shows fluctuation of the angular velocity 1 of the pulley 56 in relation to changes in the compressor rotation speed. In the graphs of FIGS. 5A and 5B, broken lines show the results of a simulation of this embodiment, in which the spiral spring 64 was used as the elastic means. Solid lines show the results of a simulation using a prior art mechanism, in which a rubber hub (rubber dampener) is used instead of the spiral spring 64.

In the above simulations, the spring constant $K_2$ of the prior art rubber hub is set to 566 Nm/rad and the spring constant $K_2$ of the spiral spring 64 is set to 80 Nm/rad. This is because a spring having a spring constant of 80 Nm/rad must permit 0.5 rad (radian) of torsional displacement when transmitting 40 Nm (newton meter) of torque, which corresponds to the maximum torque of a 160 cc class compressor. It is impossible to permit a 0.5 rad of torsional displacement using a rubber hub. However, the spring constant of an elastic member formed by a metal spiral or coil spring has a sufficiently low spring can be low enough to permit a torsional displacement of 0.5 rad.

In the graph of the shaft torque Ts in FIG. 5A, peaks Pb, Ph produced by the prior art apparatus appeared at 600 rpm and 1400 rpm. The apparatus of this embodiment had a high peak Ph at 400 rpm and a very low peak Pb at 900 rpm. In the graph of the pulley angular speed ω1 in FIG. 5B, the low and high peaks Pb, Ph of the prior art apparatus appeared at 800 rpm and 1400 rpm, respectively. The apparatus of this embodiment had a high peak Ph at 400 rpm and a low peak Pb at 900 rpm. In this manner, the two peaks Ph and Pb were observed both for the apparatus of the illustrated embodiment and for that of the prior art shown in the graphs of FIGS. 5A, 5B showing the shaft torque fluctuation and the pulley angular speed fluctuation.

A number of computer simulations were performed while changing the values of different parameters (for example, the moment of inertia $I_0$, $I_1$, $I_2$ and the spring constants $K_1$, $K_2$). As a result, the high peaks Ph of the apparatus of the illustrated embodiment and that of the prior art were greatly affected by changes in the spring constant $K_2$ and the moment of inertia $I_2$. However, the high peaks Ph were not significantly affected by changes in other parameters. That is, the frequency of the high peak Ph is determined based chiefly on the spring constant $K_2$ and the sum $I_2$ of the moment of inertia of the rotating member of the compressor and the moment of inertia of the second rotor. On the other hand, the low peaks Pb of the apparatus of the illustrated embodiment and that of the prior art were greatly affected by changes of the spring constant $K_1$ and the moment of inertia $I_1$. However, the low peaks Pb were not significantly affected by changes in other parameters. That is, the frequency of the low peaks Pb is determined based chiefly on the spring constant $K_1$ of the belt 61 and the moment of inertia $I_1$ of the first rotor.

If the pulley ratio is 1.0, the rotation speed of the compressor 11 is substantially equal to the rotation speed of the engine 62. Therefore, the normal speed of the compressor 11 is 600 rpm (the idling speed of the engine) or higher. As described above, the peaks Ph, Pb of the shaft torque and the pulley angular speed of the prior art apparatus are in the normal speed range of the compressor 11. When the rotation speed of the compressor 11 matches the speeds corresponding to the peaks Ph or Pb, the shaft torque or the pulley angular speed is rapidly increased due to resonance, which generates excessive noise.

In the apparatus of the illustrated embodiment, the high peaks Ph of the shaft torque and the pulley angular velocity are both outside of the normal speed range of the compressor 11. Thus, the rotation speed of the compressor 11 never corresponds to the high peaks Ph. The low peaks Pb are in the normal speed range of the compressor, but are relatively low. Therefore, even if the rotation speed of the compressor 11 corresponds to the low peaks Pb, little resonance is generated. The shaft torque and the pulley angular velocity are thus not excessively increased. In either case, the present invention prevents the shaft torque and the pulley angular velocity from dramatic increase at the high peaks Ph, which eliminates or suppresses generation of noise.

The resonance frequency fR of the power transmission system is the product of the rotation speed (rotation speed per second) of the compressor at which the high peak Ph occurs and the pulsation order of the compressor. Referring to FIG. 5A, the resonance frequency fR of the seven-cylinder compressor 11, which has the spiral spring 64, is calculated by the following equation:

$$fR = (400 \text{ rpm}/60 \text{ seconds}) \times 7 = 46.66 \text{ Hz} = \text{approximately } 47 \text{ Hz}$$

Therefore, the resonance frequency fR (approximately 47 Hz) of the first embodiment is lower than the lowest frequency f1 (70 Hz) of torque fluctuation of the compressor 11. In this case, the difference between f1 and fR is approximately 23 Hz, which corresponds to approximately 33% of f1. The difference between the resonance frequency fR and the lowest frequency f1 of torque fluctuation generated in the driven apparatus is preferably equal to or higher than 20% of the lowest frequency f1 of the driven apparatus and more preferably equal to or higher than 33% of f1.

Like a prior art leaf spring, the spiral spring 64 for coupling the hub 57 with the armature 58 essentially does not dampen vibration. However, the spiral spring 64 functions as an elastic means to change the resonance frequency fR of a vibrating system. If the resonance frequency fR is set lower than the lowest frequency f1 of torque fluctuation of the compressor 11 by lowering the spring constant $K_2$ of the spiral spring 64, the compressor 11 is not operated at the rotational speed of the resonance point or in the vicinity of that speed. Therefore, even if the spiral spring 64 does not suppress vibration at the resonance frequency fR, there is no problem.

The resonance frequency fR is determined based chiefly on the spring constant $K_2$ of the spiral spring 64 and the sum $I_2$ of the moment of inertia of the rotating member of the compressor 11 and the moment of inertia of the second rotor. The spring constant $K_2$ of the spiral spring 64 is determined such that the resonance frequency fR is lower than the lowest frequency f1 of torque fluctuation of the compressor 11, which serves as a driven apparatus.

When the spring constant $K_2$ of the spiral spring 64 was set to 80 Nm/rad, the high peak Ph, which is determined based chiefly on the spring constant $K_2$ and the sum $I_2$ of the moments of inertia, appeared in a range including 400 rpm, and the resonance frequency fR at the time was approximately 47 Hz. Suppose the high peak Ph is shifted to 200 rpm, which is lower than 400 rpm, by making the spring constant $K_2$ of the spiral spring 64 smaller than 80 Nm/rad. In this case, the resonance frequency fR is represented by the following equation:

$$fR=(200\ rpm/60\ seconds)\times 7=23.33\ Hz=approximately\ 23\ Hz.$$

Accordingly, the following inequality is satisfied:

$$fR(23\ Hz)<f2(30\ Hz)<f1(70\ Hz)$$

Therefore, the resonance frequency fR is lower than the lowest frequency f1 of torque fluctuation of the compressor 11 (driven apparatus) and is lower than the lowest frequency f2 of torque fluctuation of the engine 62 (drive source). That is, the resonance frequency fR is outside of the ranges of torque fluctuations of the compressor 11 and the engine 62. Therefore, for any torque fluctuations in the compressor 11 and the engine 62, the amplitudes of the torque fluctuations are not increased due to resonance.

The first embodiment has the following advantages.

The resonance frequency fR of the vibrating system, which includes the first rotor (the pulley 56 and the armature 58), the elastic means (the spiral spring 64), the second rotor (the hub 57) and the driven apparatus (the compressor 11), is set lower than the lowest frequency of torque fluctuation generated in the compressor 11. Therefore, if torque fluctuation occurs in the normal speed range of the compressor 11, the amplitude of the torque fluctuation is not amplified by resonance of the vibrating system. Thus, excessive noise and damage to the rotating system due to torque fluctuation of the compressor 11 are prevented.

In the same manner, the resonance frequency fR of the vibrating system is set lower than the lowest frequency f2 of torque fluctuation generated in the engine 62. Therefore, when the engine speed is in the normal range, the amplitude of torque fluctuation generated in the engine 62 is not increased by resonance of the vibrating system. Thus, excessive noise and damage to the rotating system due to torque fluctuation of the engine 62 are prevented.

The spiral spring 64 is provided between the armature 58 and the hub 57 of the electromagnetic clutch 55 without changing the structure of a conventional electromagnetic clutch. In other words, according to the first embodiment, space for the elastic member is available.

Since the spiral spring 64 also functions as an urging means for separating the armature 58 from the pulley 56, there is no need for a separate urging member for the armature 58 and a separate elastic member for suppressing vibrations. Therefore, compared to a case in which two separate members are provided, this apparatus reduces the size of the power transmission mechanism, and a space for the mechanism is easily obtained. The spiral spring 64, which functions as both urging means and elastic means, reduces the number of parts in the power transmission mechanism and simplifies the structure.

Before installed, the spiral spring 64 has an axially extended spiral shape. The spiral spring 64 is compressed to be flat and installed adjacent to the armature 58. Therefore, when the solenoid 59 is de-excited, the armature 64 applies relatively great force to the armature 58 thereby quickly separating the armature 58 from the pulley 56 even if there is remanence.

The elastic means comprises the spiral spring 64, which has the arms 641, 642. Thus, the elastic means transmits little load other than torque between the compressor and the engine. Therefore, the load acting on the angular bearing 60 and the load acting on the radial bearing 18 are not increased.

When installed between the hub 57 and the armature 58, the spiral spring 64 is axially compressed. Thus, an axially narrow space formed at a side of the armature 58 opposite from the side facing the pulley 56 can be used to accommodate the spiral spring 64. In this manner, according to the first embodiment, the space for the spiral spring 64 is easily obtained.

The shape of the spiral spring 64 results in the same stress at every part of the spring 64, which allows the size of the spring 64 to be minimized. This also minimizes the weight of the spiral spring 64.

Since the arms of the spiral spring 64 have rectangular-shaped cross-sections, a relatively great spring constant is obtained with a relatively small cross-sectional area of the spring 64. Additionally, a rectangular cross-section allows the cross-sectional area of a spring to be decreased when decreasing the spring constant. This is advantageous in reducing the size and the weight of the spiral spring 64.

Since the outer ends of the arms 641, 642 of the spiral spring 64 are pivotally supported by the armature 58, stress tends to concentrate at a certain part of the spiral spring 64 when transmitting power. So that each arm of the spring is uniformly stressed, the cross-sectional area of the part where the stress tends to concentrate is preferably increased. The spiral spring 64 of the first embodiment has a rectangular cross-section at the arms. Therefore, by simply enlarging the radial dimension of the arm when pressing the spring 64, the cross-sectional area of parts to which stress concentrate is easily enlarged.

Modification of the First Embodiment

In the first embodiment, the inequality fR<f2<f1 is satisfied. In this modification, an inequality fR<f1<f2 is satisfied. In this modification, the compressor 11 (seven-cylinder type) serving as a driven apparatus is replaced with a scroll compressor.

A scroll compressor discharges compressed gas once per revolution of a drive shaft. Therefore, the pulsation order of a scroll compressor is one. The drive source is a six-cylinder four-stroke engine 61, as in the first embodiment, and the pulley ratio is 1.0. In the graph of the shaft torque Ts in FIG. 5A, the high peak Ph is determined based chiefly on the spring constant $K_2$ and the sum $I_2$ of two of the moments of inertia. The rotation speed of the compressor corresponding to the high peak Ph is defined as X (rpm). The calculated value of the resonance frequency corresponding to X is defined as Y (Hz). The resonance frequency fR, the lowest frequency f1 of torque fluctuation of the scroll compressor serving as a driven apparatus and the lowest frequency f2 of torque fluctuation of the engine 62 serving as a drive source are calculated in the following manner:

fR: (X rpm/60 seconds)×1=Y Hz f1: (600 rpm/60 seconds)×1.0×1=10 Hz f2: (600 rpm/60 seconds)×3=30 Hz When the rotation speed X corresponding to the high peak Ph changes in the following manner, the calculated value Y of the resonance frequency Y will have the following values.
When X is 300 rpm, Y is 5.0.
When X is 400 rpm, Y is 6.66.
When X is 500 rpm, Y is 8.33.
When X is 600 rpm or higher, Y is 10.0 or higher.

Referring to the above calculations, when the rotation speed X corresponding to high the peak Ph is lower than 600 rpm, the inequality fR<f1<f2 is satisfied.

In this manner, if a scroll compressor is used as a driven apparatus, the resonance frequency fR of the vibrating system is set lower than f1 and f2 by properly setting the spring constant $K_2$ of the spiral spring 64. Accordingly, the resonance frequency fR is outside of the frequency bands of torque fluctuations of the scroll compressor and the engine 62. As a result, this modification has the same advantages as the first embodiment.

Second Embodiment

FIGS. 6, 7, 8A and 8B show a second embodiment of the present invention. The second embodiment is different from the first embodiment in that helical coil springs are used instead of the spiral spring 64 and the power of the engine 62 is directly transmitted to the drive shaft 17 without an electromagnetic clutch. Like or the same reference numerals are given to those components that are like or the same as the corresponding components of the first embodiment. In the second embodiment, the body of the compressor 11 is not illustrated. The pulley 56 forms the first rotor and the hub 57 forms the second rotor.

Figure 8B:
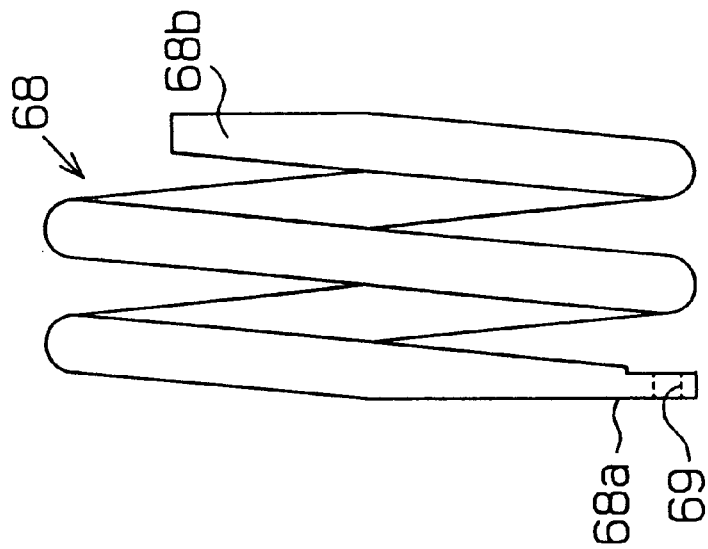
FIG. 8B is a side view illustrating the coil spring.
Figure 8A:
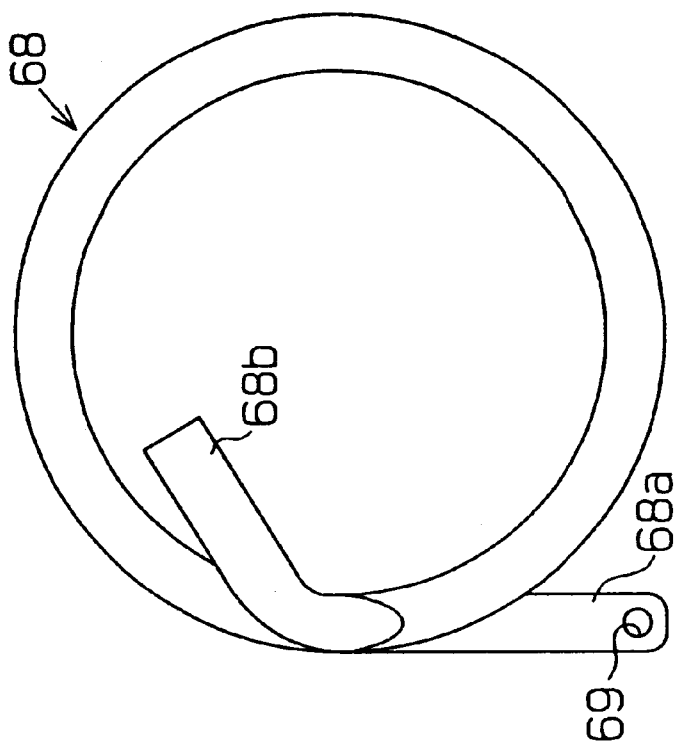
FIG. 8A is a front view illustrating the coil spring.

As shown in FIGS. 8A and 8B, the elastic means, or coil spring 68, is coiled two and a half turns and has a first end 68a and a second end 68b. The first end 68a extends in a straight manner and is tangential to the circle of the coil. The first end 68a is flattened as shown in FIG. 8B. A hole 69 is formed in the first end 68a. The hole 69 extends parallel to the axis of the coil. As shown in FIG. 8A, the second end 68b is bent to protrude inward, and the end face is perpendicular to the axis of the second end 68b. The installation of the coil spring 68 will be described later. Rotation of the pulley 56 applies torsional force to the coil spring 68. The coiling direction of the coil spring 68 is such that the coil loosens when the coil 68 receives the torsional force.

Figure 7:
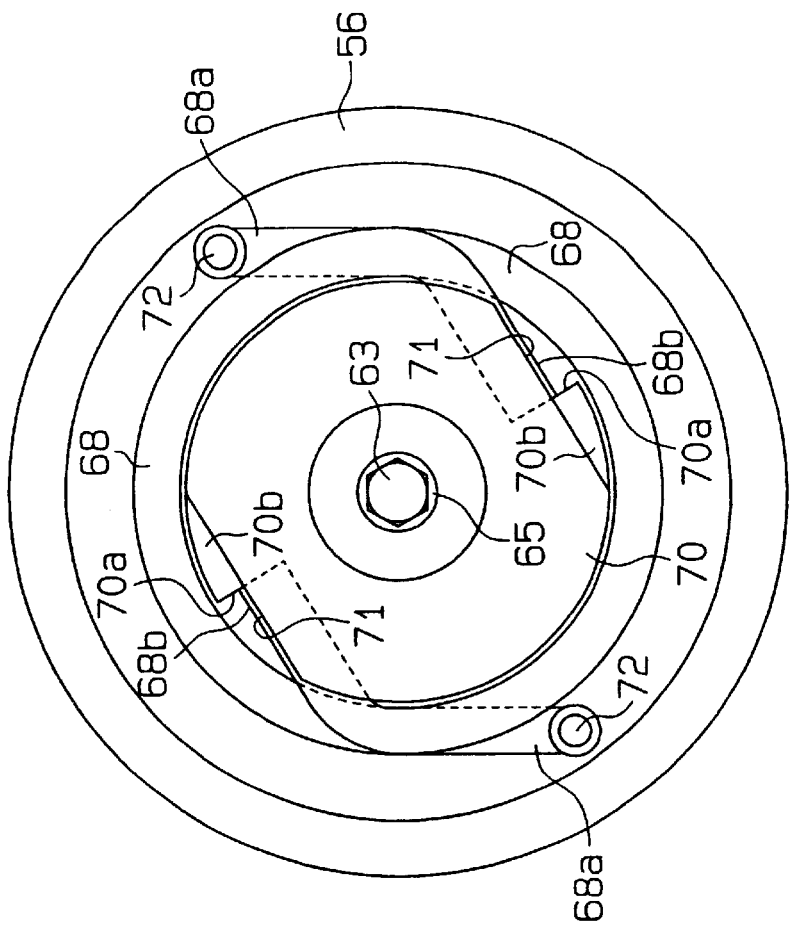
FIG. 7 is a front view illustrating the installed coil spring according to the second embodiment.
Figure 6:
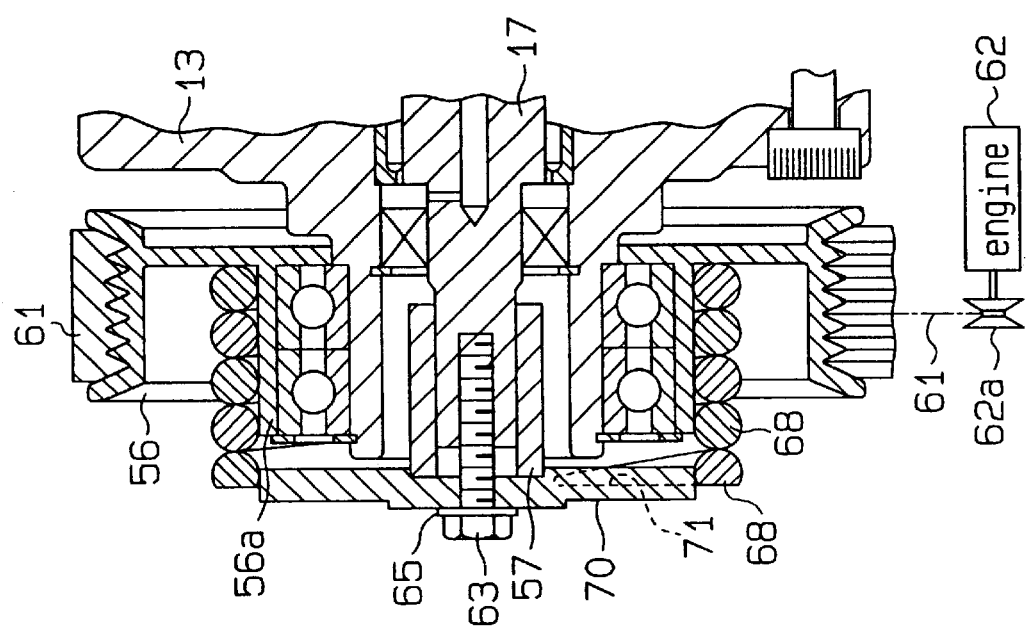
FIG. 6 is a partial cross-sectional view illustrating a swash plate type compressor having a power transmission mechanism according to a second embodiment.

As shown in FIGS. 6 and 7, a disk 70 is located at the front end of the hub 57. The disk 70 is welded to the hub 57 and forms part of the hub 57. The pulley 56 includes a support cylinder 56a. The pulley 56 is supported on the angular bearing 60 by the support cylinder 56a. The diameter of the disk 70 is substantially the same as the outer diameter of the support cylinder 56a. Two engagement recesses 71 are formed in the outer periphery of the rear side of the disk 70. Each engagement recess 71 has open circumferential and trailing sides. The engagement recesses 71 are spaced apart by 180 degrees relative to the center of the disk 70. As shown in FIG. 7, the disk 70 has two steps 70a, each corresponding to one of the engagement recess 71. The disk 70 also has two peripheral slopes 70b. Each slope 70b corresponds to one of the steps 70a.

Elastic means, which includes the two coil springs 68, is located about the support cylinder 56a of the pulley 56. The coil springs 68 are loosely fitted about the support cylinder 56a. The two coil springs 68 are engaged with each other such that the first ends are displaced by 180 degrees, and the second ends are displaced by 180 degrees. In this state, the first ends extend parallel to each other and the second ends extend parallel to each other. The first end 68a of each coil spring 68 is pivotally connected to the pulley 56 by a rivet 72 inserted in the hole 69. The second end 68b of each coil spring 68 is engaged with the engagement recess 71 of the hub 57 to couple the pulley 56 to the hub 57. When the coil springs 68 are uncompressed, or when the second ends 68b are not engaged with the corresponding engagement recess 71, each second end 68b is located axially forward of the front face of the disk 70. When compressed, the coil springs 68 are engaged with the engagement recesses 71 of the disk 70 in a compressed state.

The resonance frequency fR is determined based chiefly on the spring constant of the elastic means, which includes the two coil springs 68, and the sum of the moments of inertia of the rotating member of the compressor 11 and the second rotor. As in the first embodiment, the spring constant of the elastic means is determined such that the resonance frequency fR is lower than the lowest frequency f1 of torque fluctuations generated in the compressor 11. More preferably the spring constant of the elastic means is also determined such that the resonance frequency fR is lower than the lowest frequency f2 of torque fluctuations generated in the engine 62.

In the second embodiment, the power of the engine 62 is constantly transmitted to the drive shaft 17 of the compressor 11 through the belt 61, the pulley 56, the coil springs 68 and the hub 57. Basically, the compressor 11 operates in the same manner as when the electromagnetic clutch 55 is engaged in the first embodiment.

When the compressor 11 is operating, torque fluctuation of the compressor 11 is suppressed by deformation of the coil springs 68 as long as the fluctuation is within a predetermined acceptable range. Further, as in the first embodiment, the resonance frequency fR of the vibrating system, which includes the first rotor (the pulley 56), the elastic means (the coil springs 68), the second rotor (the hub 57 and the disk 70) and the driven apparatus (the compressor 11), is set lower than the lowest frequency f1 of torque fluctuation generated in the compressor 11. Therefore, when torque fluctuation occurs in the compressor 11, the amplitude of the torque fluctuation is not increased by resonance of the vibrating system. As a result, excessive noise and damage to the rotating system due to torque fluctuation of the compressor 11 are prevented.

If the compressor 11 receives an excessive load torque that is out of the acceptable range, the rotation speed of the pulley 56 differs from the rotation speed of the hub 57. This deforms the coil springs 68 and bends the second ends 68b outward. Accordingly, the end face of each second end 68b is disengaged from the corresponding engagement recess 71. Since the coil springs 68 are installed in an axially compressed state, the axial restoration force of the coil springs 68 moves the second ends 68b to a position corresponding to the front face of the disk 70 when the second ends 68b are disengaged from the engagement recesses 71. In this manner, when the compressor 11 receives an excessive load torque, the coil springs 68 are disengaged from the disk 70 and from the hub 57, which stops power transmission from the pulley 56 to the drive shaft 17. That is, the power transmission mechanism according to the second embodiment also functions as a torque limiter.

A compressor having the power transmission mechanism according to the second embodiment has the same advantages as the first embodiment. The compressor further has the following advantages.

Since the elastic means includes a plurality of coil springs 68, loads other than torque are not easily transmitted between the compressor and the drive source. Therefore, the load acting on the bearing or the pulley 56 and load acting on the radial bearing 18 of the drive shaft 17 are not increased to an undesired level.

Unlike the first embodiment, the second embodiment has no electromagnetic clutch 55. Thus, the space for the solenoid of the electromagnetic clutch 55 can be used for the coil springs 68. In this manner, according to the second embodiment, the space for the coil springs 68 is easily obtained.

The two coil springs 68 form a double helix. Therefore, the coil springs 68 prevent the hub 57 and the drive shaft 17 from inclining thereby stabilizing rotation of the drive shaft 17 when transmitting power from the engine 62.

When an excessive load torque acts on the compressor 11, the power transmission mechanism including the coil springs 68 functions as a torque limiter. Therefore, according to the second embodiment, when an excessive torque is generated in the compressor 11, the torque is prevented from being transmitted to the drive source (the engine 62).

The steps 70a and the slopes 70b formed in the disk 70 allow the second end 68b of each coil spring 68 to quickly disengage from the engagement recess 71 when an excessive torque is generated in the compressor 11.

Modifications

The embodiments of the present invention may be modified as follows.

In the first embodiment, the arms 641, 642 of the spiral spring 64 may have a constant cross-sectional area from the inner end to the outer end. Alternatively, the cross-section of each arm may be circular or elliptic.

In the first embodiment, the electromagnetic clutch 55 may be omitted while using the spiral spring 64. For example, the armature 58 and the solenoid 59 may be omitted and the outer end of each arm of the spiral spring 64 may be directly and pivotally coupled to the front face of the pulley 56.

In the first embodiment, the number of arms of the spiral spring 64 may be one or more than two. When the spiral spring 64 has more than two arms, the arms are preferably spaced apart by equal angular intervals, or at the same phase differences.

Instead of pressing, the spiral spring 64 of the first embodiment may be manufactured by bending a bar having predetermined width and thickness.

In the first embodiment, the outer ends of the arms 641, 642 of the spiral spring 64 may be secured to the armature 58 such that the arms 641, 642 do not pivot relative to the armature 58.

In the second embodiment, the first end 68a of each coil spring 86 may be secured to the pulley 56 such that the first end 68a does not pivot relative to the pulley 56.

In the second embodiment, the second end 68b of each coil spring 68 may be fixed to the hub 57.

In the second embodiment, the cross-section of each coil spring 68 may be rectangular. For a given spring constant, a coil spring having a rectangular cross-section has a smaller diameter than a coil spring having a circular cross-section.

Figure 9:
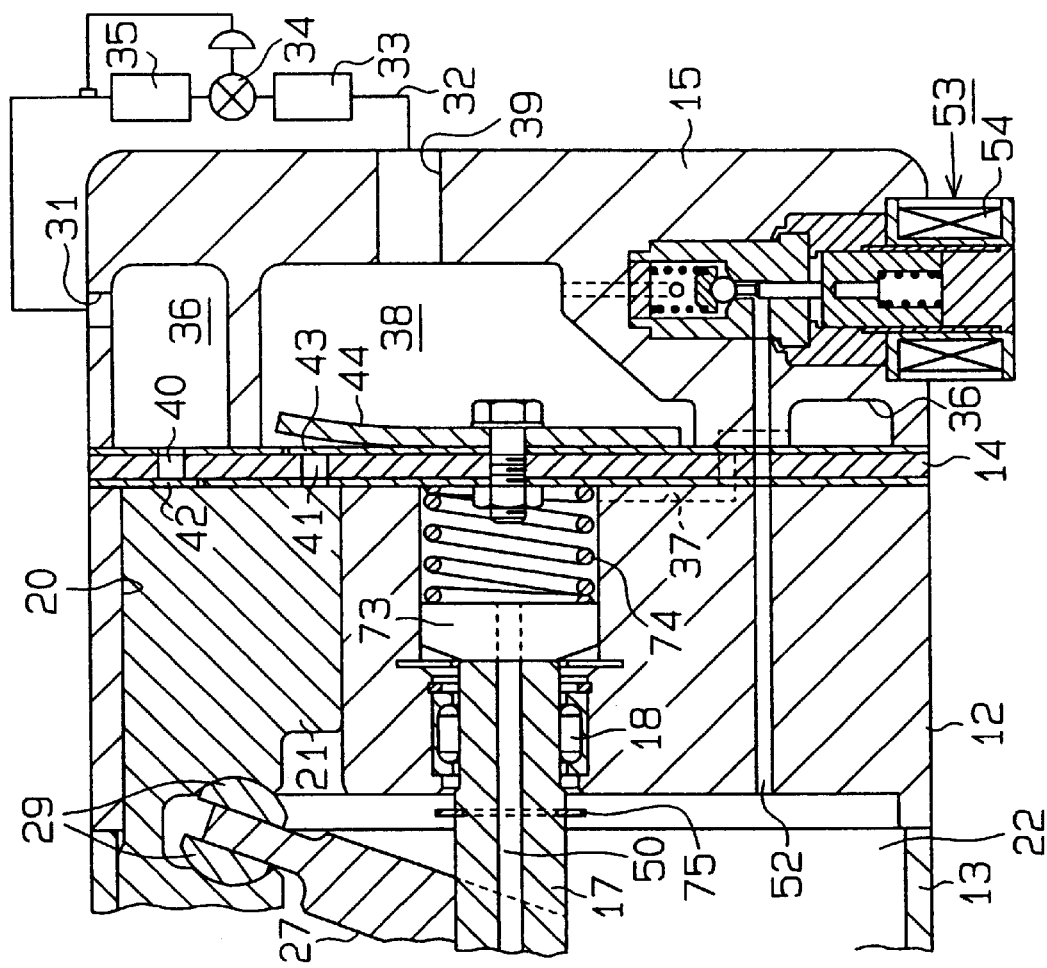
FIG. 9 is a partial cross-sectional view showing a compressor according to a further embodiment.

In the first and second embodiments, the compressor 11 has a mechanism (the shutter 45) for stopping circulation of refrigerant between the compressor 11 and the external refrigerant circuit 32. The compressor 11 may be replaced with a compressor having no such mechanism (for example, the compressor shown in FIG. 9). In the compressor of FIG. 9, the rear end of the drive shaft 17 is directly supported by the cylinder block 12 through the radial bearing 18. The drive shaft 17 is urged forward by a spring 74 through a bushing 73 contacting the rear end of the shaft 17. The bushing 73 functions a thrust bearing. A snap ring 75 is secured to the drive shaft 17. The snap ring 75 contacts the swash plate 27 to define the minimum inclination of the swash plate 27. The displacement of the compressor increases when the displacement control valve 53 is closed and decreases when the displacement control valve 53 is open.

The axial force of the spiral spring 64 may be increased. If the force of the spring 64 is sufficient to urge the drive shaft 17 forward, the bushing 73 and the spring 74 may be omitted. If the spiral spring 64 is replaced with the coil springs 68, the bushing 73 and the spring 74 may be omitted by adjusting the axial force of the coil springs 68 when installing the springs 68.

The present invention may be embodied in other types of variable displacement compressors such as wobble type compressor having a swash plate. The driven apparatus may be other types of compressors having pistons such as a swash plate compressor of fixed displacement or a wave cam plate type compressor. Alternatively, the driven apparatus may be a compressor other than piston type compressors (for example, a vane compressor). Further, the driven apparatus may be a rotational apparatus other than a compressor (for example, a pump).

What is claimed is:

1. A power transmission mechanism for connecting a first rotor to a second rotor, wherein the second rotor is coaxial to and driven by the first rotor, and the second rotor is fixed to a rotating member, such that the rotating member is driven by the first rotor, and the rotating member produces torque fluctuation when driven, the mechanism comprising:

an elastic means for connecting the first rotor to the second rotor, wherein the spring constant of the elastic means is set such that a resonance frequency based primarily on the spring constant of the elastic means and the sum of the moments of inertia of the second rotor and the rotating member is lower than the lowest frequency of torque fluctuation produced by the rotating member.

2. The mechanism according to claim 1, wherein the first rotor comprises a pulley driven by a power source with a belt, and the second rotor comprises a hub fixed to a drive shaft, wherein the drive shaft is part of the rotating member.

3. The mechanism according to claim 1, wherein the elastic means is a metal spring.

4. The mechanism according to claim 1, wherein the elastic means is a metal spring that is generally conical when unstressed.

5. The mechanism according to claim 1, wherein the first rotor comprises a pulley and an armature, the pulley being driven by a power source with a belt, wherein the armature is selectively engaged with the pulley, and, when fully engaged with the pulley, the armature rotates integrally with the pulley, and the second rotor comprises a hub fixed to a drive shaft, wherein the drive shaft is part of the rotating member.

6. The mechanism according to claim 5, wherein the elastic means urges the armature in an axial direction away from the pulley.

7. The mechanism according to claim 6, wherein the elastic means is a spiral spring.

8. The mechanism according to claim 6, wherein the elastic means is a spiral spring that is compressed axially when installed.

9. The mechanism according to claim 1, wherein the elastic means is a spiral spring.

10. The mechanism according to claim 9, wherein the spiral spring has a rectangular cross-section.

11. The mechanism according to claim 1, wherein the elastic means is a helical spring.

12. The mechanism according to claim 11, wherein the helical spring has a rectangular cross-section.

13. The mechanism according to claim 1, wherein the first rotor is driven by a power source, the torque of which fluctuates, wherein the spring constant of the elastic means is additionally such that the resonance frequency is lower than the lowest frequency of the torque fluctuation of the power source.

14. A power transmission mechanism for connecting a first rotor to a second rotor, wherein the second rotor is coaxial to and driven by the first rotor, and the second rotor is fixed to a rotating member, such that the rotating member is driven by the first rotor, wherein the first rotor is driven by a drive source that has fluctuating torque, the mechanism comprising:
  an elastic means for connecting the first rotor to the second rotor, wherein the spring constant of the elastic means is set such that a resonance frequency based primarily on the spring constant of the elastic means and the sum of the moments of inertia of the second rotor and the rotating member is lower than the lowest frequency of the torque fluctuation of the drive source.

15. The mechanism according to claim 14, wherein the first rotor comprises a pulley driven by the power source with a belt, and the second rotor comprises a hub fixed to a drive shaft, wherein the drive shaft is part of the rotating member.

16. The mechanism according to claim 14, wherein the elastic means is a metal spring.

17. The mechanism according to claim 14, wherein the elastic means is a metal spring that is generally conical when unstressed.

18. The mechanism according to claim 14, wherein the first rotor comprises a pulley and an armature, the pulley being driven by the power source with a belt, wherein the armature is selectively engaged with the pulley, and, when fully engaged with the pulley, the armature rotates integrally with the pulley, and the second rotor comprises a hub fixed to a drive shaft, wherein the drive shaft is part of the rotating member.

19. The mechanism according to claim 18, wherein the elastic means urges the armature in an axial direction away from the pulley.

20. The mechanism according to claim 19, wherein the elastic means is a spiral spring.

21. The mechanism according to claim 19, wherein the elastic means is a spiral spring that is compressed axially when installed.

22. The mechanism according to claim 14, wherein the elastic means is a spiral spring.

23. The mechanism according to claim 22, in the spiral spring has a rectangular cross-section.

24. The mechanism according to claim 14, wherein the elastic means is a helical spring.

25. The mechanism according to claim 14, wherein the helical spring has a rectangular cross-section.

26. The mechanism according to claim 14, wherein the rotating member produces torque fluctuation when driven, and wherein the spring constant of the elastic means is additionally set such that the resonance frequency is lower than the lowest frequency of the torque fluctuation of the rotary member.

27. A power transmission mechanism for connecting a first rotor to a second rotor, wherein the second rotor is coaxial to and driven by the first rotor, and the second rotor is fixed to a rotating member, such that the rotating member is driven by the first rotor, and the rotating member produces torque fluctuation when driven, the mechanism comprising:
  a spring connecting the first rotor to the second rotor, wherein a spring constant of the spring is set such that a resonance frequency based primarily on the spring constant of the spring and the sum of the moments of inertia of the second rotor and the rotating member is lower than the lowest frequency of torque fluctuation produced by the rotating member.

28. The mechanism according to claim 27, wherein the first rotor comprises a pulley and an armature, the pulley being driven by a power source with a belt, wherein the armature is selectively engaged with the pulley, and, when fully engaged with the pulley, the armature rotates integrally with the pulley, and the second rotor comprises a hub fixed to a drive shaft, wherein the drive shaft is part of the rotating member.

29. The mechanism according to claim 28, wherein the spring urges the armature in an axial direction away from the pulley.

30. The mechanism according to claim 29, wherein the spring is a spiral spring.

31. The mechanism according to claim 29, wherein the spring is a spiral spring that is compressed axially when installed.

32. The mechanism according to claim 27, wherein the spring is a spiral spring.

33. The mechanism according to claim 27, wherein the spring is a helical spring.

34. The mechanism according to claim 27, wherein the first rotor is driven by a power source, the torque of which fluctuates, wherein the spring constant of the spring is additionally such that the resonance frequency is lower than the lowest frequency of the torque fluctuation of the power source.

35. A power transmission mechanism for connecting a first rotor to a second rotor, wherein the second rotor is coaxial to and driven by the first rotor, and the second rotor is fixed to a rotating member, such that the rotating member is driven by the first rotor, wherein the first rotor is driven by a drive source that has fluctuating torque, the mechanism comprising:
  a spring connecting the first rotor to the second rotor, wherein a spring constant of the spring is set such that a resonance frequency based primarily on the spring constant of the spring and the sum of the moments of inertia of the second rotor and the rotating member is lower than the lowest frequency of torque fluctuation produced of the torque fluctuation of the drive source.

36. The mechanism according to claim 35, wherein the first rotor comprises a pulley and an armature, the pulley being driven by a power source with a belt, wherein the armature is selectively engaged with the pulley, and, when fully engaged with the pulley, the armature rotates integrally with the pulley, and the second rotor comprises a hub fixed to a drive shaft, wherein the drive shaft is part of the rotating member.

37. The mechanism according to claim 36, wherein the spring urges the armature in an axial direction away from the pulley.

38. The mechanism according to claim 37, wherein the spring is a spiral spring.

39. The mechanism according to claim 37, wherein the spring is a spiral spring that is compressed axially when installed.

40. The mechanism according to claim 35, wherein the spring is a spiral spring.

41. The mechanism according to claim 35, wherein the spring is a helical spring.

42. The mechanism according to claim 35, wherein the rotating member produces torque fluctuation when driven, and wherein the spring constant of the spring is additionally set such that the resonance frequency is lower than the lowest frequency of the torque fluctuation of the rotary member.

* * * * *